United States Patent
Fuentes et al.

[11] Patent Number: 5,825,299
[45] Date of Patent: Oct. 20, 1998

[54] OBJECT IDENTIFICATION SYSTEM

[75] Inventors: Vincent Fuentes, Peseux, Switzerland; Hans Ulrich Fritsch, Eckental, Germany; Andreas Merz, Ruckersdorf, Germany; Georg Plasberg, Kalchreuth, Germany; Wolfgang Kraft, Ruckersdorf, Germany

[73] Assignee: EM Microelectronic-Marin SA, Marin, Switzerland

[21] Appl. No.: 633,479

[22] Filed: Apr. 17, 1996

[30] Foreign Application Priority Data

Apr. 18, 1995 [DE] Germany .................. 295 06 290 U
Jun. 20, 1995 [EP] European Pat. Off. ............. 95109501

[51] Int. Cl.⁶ .................. H04Q 5/22; H04Q 7/00; G08B 13/14
[52] U.S. Cl. .................. 340/825.54; 455/31.1; 340/572
[58] Field of Search .................. 340/825.54, 825.58, 340/825.77, 568, 825.52, 505, 572; 375/268, 269; 455/31.1, 37.1

[56] References Cited

U.S. PATENT DOCUMENTS

| | | | |
|---|---|---|---|
| 3,670,303 | 6/1972 | Dame | 342/42 |
| 3,755,811 | 8/1973 | Breckman | 342/42 |
| 3,859,634 | 1/1975 | Perron et al. | 340/149 A |
| 3,914,762 | 10/1975 | Klench | 340/825.54 |
| 4,931,788 | 6/1990 | Creswick | 340/825.54 |
| 5,361,062 | 11/1994 | Weiss et al. | 340/825.33 |
| 5,519,729 | 5/1996 | Jurisch et al. | 375/259 |
| 5,525,991 | 6/1996 | Nagura et al. | 342/42 |
| 5,537,105 | 7/1996 | Marsh et al. | 340/825.54 |

FOREIGN PATENT DOCUMENTS

| | | |
|---|---|---|
| 0 582 137 | 7/1993 | European Pat. Off. |
| 42 40 879 | 6/1994 | Germany |
| WO 90/14484 | 11/1990 | WIPO |

*Primary Examiner*—Michael Horabik
*Assistant Examiner*—Anthony A. Asongwed
*Attorney, Agent, or Firm*—Griffin, Butler, Whisenhunt & Szipl, LLP

[57] ABSTRACT

An object identification system comprises a transceiver (1) and a transponder (30) including memories (33,34) for storing an identification code identifying the transponder. Circuits (35, 36, 37, 38) generate an identification signal representative of the identification code such that the identification signal is modulated by bits of the identification code. Circuits (8, 9, 10, 11, 12) of the transceiver receive and interpret the identification signal. The transponder includes a variable code generator (32) and a controller (31) for controlling the writing of the variable code into memory (33) so that the variable code constitutes part of the identification code. The variable code may be a random or pseudo-random code.

22 Claims, 4 Drawing Sheets

OBJECT IDENTIFICATION SYSTEM

FIELD OF THE INVENTION

The present invention concerns object identification systems including a transceiver and at least one transponder. The transceiver comprises notably means for transmitting a write signal. The transponder comprises notably means for receiving and for the detecting the write signal, a memory device for storing an identification code of the transponder, and means for creating an identification signal representative of the identification code. Furthermore, the transceiver comprises means for receiving and interpreting the identification signal.

BACKGROUND OF THE INVENTION

Object identification systems of the type defined above are currently used during sporting competitions, firstly, for attributing a unique code to each competitor and, secondly, for detecting the finishing order of these competitors. In known object identification systems, a transponder is attributed to each competitor before the start of the competition. The transponder includes a memory device which contains a unique identification code.

At the arrival of each competitor at the finish, a transceiver transmits an interrogation signal. The detection of this signal creates the transmission of an identification signal by the transponder in question, this signal being representative of the identification code stored in its memory device. The transceiver is adapted to receive and to interpret this identification signal so as to be able to determine from which transponder, and thus from which competitor, is originates. Thus, by identifying the transponder which belongs to each identification signal, the transceiver can determine the finishing order of the competitors.

However, such systems are subject to abuse by third parties who wish to manipulate the results of a competition. For example, a particular transponder may be interrogated, before the start of the competition, by a non authorised interrogation signal, which causes the premature transmission of the identification signal of the transponder. The demodulation of this identification signal enables the detection of its identification code.

It is thus relatively simple for a third party to generate a signal including a carrier modulated by this particular identification code. The transmission of this signal in the receiving zone of the transceiver which governs the results of the competition in question, prior to the actual arrival at the finish of the competitor bearing the transponder containing the particular identification code, will cause the false interpretation that this competitor has just finished the competition.

In order to address this problem, object identification systems exist in which the identification code is only stored in the memory device of the transponder at, or just before, the start of the competition. In these object identification systems, the transceiver is adapted, in an initialisation mode, to transmit a write signal including a write code followed by a random identification code. These codes are constituted by bits, the amplitude of the write signal varying as a function of the logical state of these bits.

When a transponder detects this write signal, it writes the identification code, which has just been sent to it, into its memory device. Thus, it is no longer possible to interrogate in advance the transponder so as to determine its identification code, since this is not known before the start of the competition.

However, this solution only partially overcomes the abuse of such object identification systems. This still exists the risk that a third party, equipped with a receiver, can capture the write signal emitted by the transceiver during the initialisation of a particular transponder and, as a consequence, that this third party can determine the identification code attributed to a particular transponder. This risk is all the more real because the transponder is generally a low cost device constituted by components which do not have a high signal detection sensitivity. In other words, the signal received by the transponder must have a significant variation of amplitude in order that the transponder is able to determine the codes which these signals contain. This large variation in amplitude makes the identification signal emitted by the transceiver even more detectable by a third party.

It can thus be seen that a third party can relatively easily generate a signal which enables the modulation of the carrier signal emitted by the transceiver by this particular identification code. As before, the transmission of this signal in the receiving zone of the transceiver, before the actual arrival of the competitor bearing the transponder which contains this particular identification code, will cause the false interpretation of the arrival ahead of time of the competitor and the non authorised manipulation of the result of the competition.

SUMMARY OF THE INVENTION

The aim of the present invention is to provide an object identification system which at least partially ameliorates these inconveniences.

The aim of the present invention is also to provide an object identification system with which the non authorised detection of the identification code attributed to the transponder is made more difficult than is the case with known object identification systems.

The object of the present invention is an object identification system comprising : a transceiver having a first signal detection sensitivity including     means for transmitting a write signal; and at least a transponder having a second signal detection sensitivity which is less than the first sensitivity including     means for receiving and detecting said write signal,     a memory device for storing an identification code of said transponder, this identification code including bits being able to have a plurality of logic states,     means for creating an identification signal representative of the identification code such that said identification signal is modulated by the logical state of said bits;

said transceiver further comprising means for receiving and interpreting said identification signal, characterised in that said transponder further comprises     a variable code generator, and     means for writing in said memory device, in response to the detection of said write signal, a variable code provided by said variable code generator such that said variable code constitutes at least a part of said identification code.

Thus, the identification code belonging to each transponder is firstly created therein during its initialisation. This code may then be transmitted to the transceiver by means of an identification signal whose weak modulation makes difficult the detection at distance of the identification code which this signal comprises.

BRIEF DESCRIPTION OF THE DRAWINGS

Other characteristics and advantages of the invention will appear during the description which will follow, provided solely as an example and made by referring to the annexed drawings in which.

DESCRIPTION OF PREFERRED EMBODIMENTS

Figure 1:
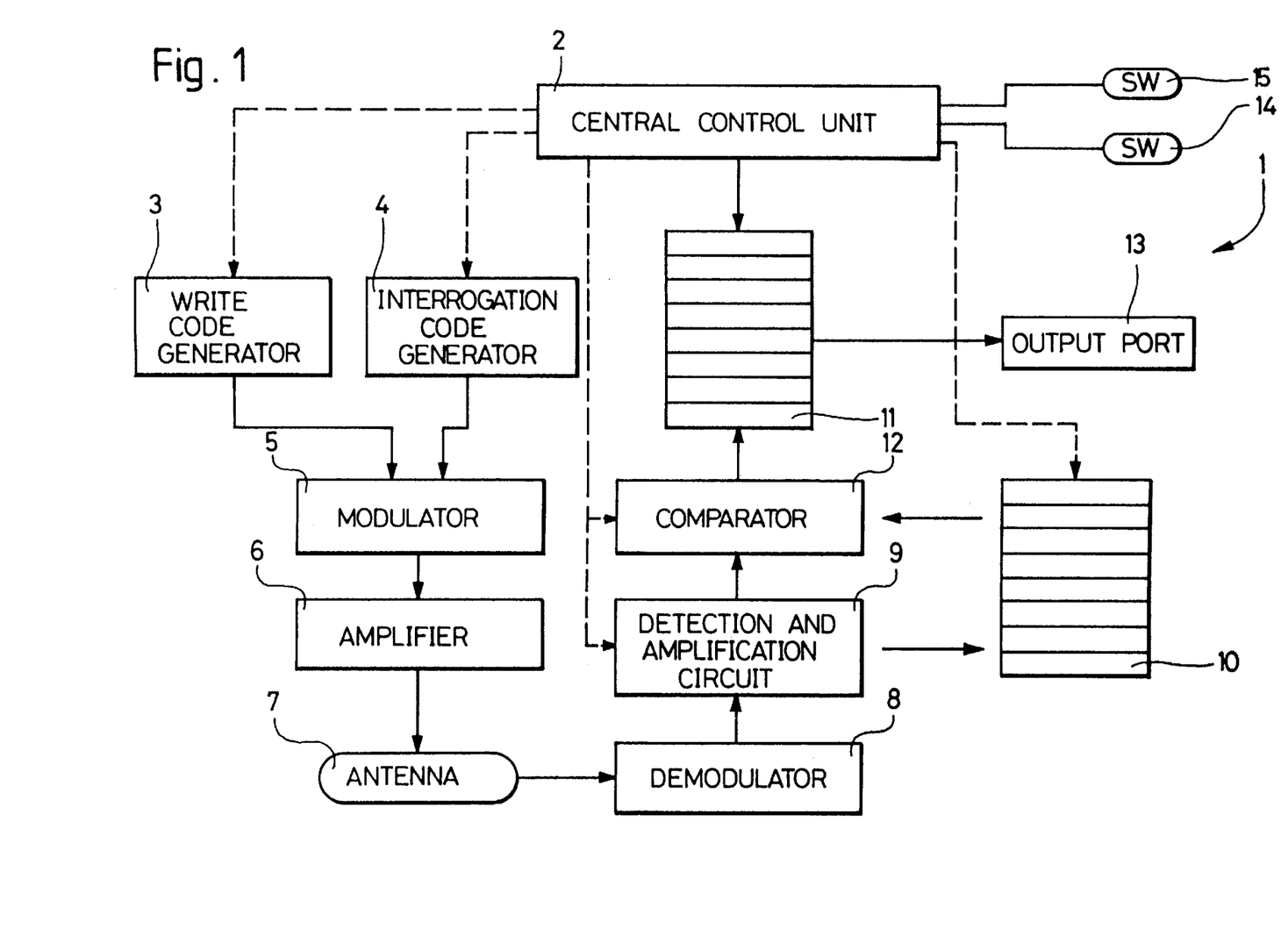
FIG. 1 is a schematic diagram of a transceiver forming part of the object identification system of the present invention.
Figure 3:
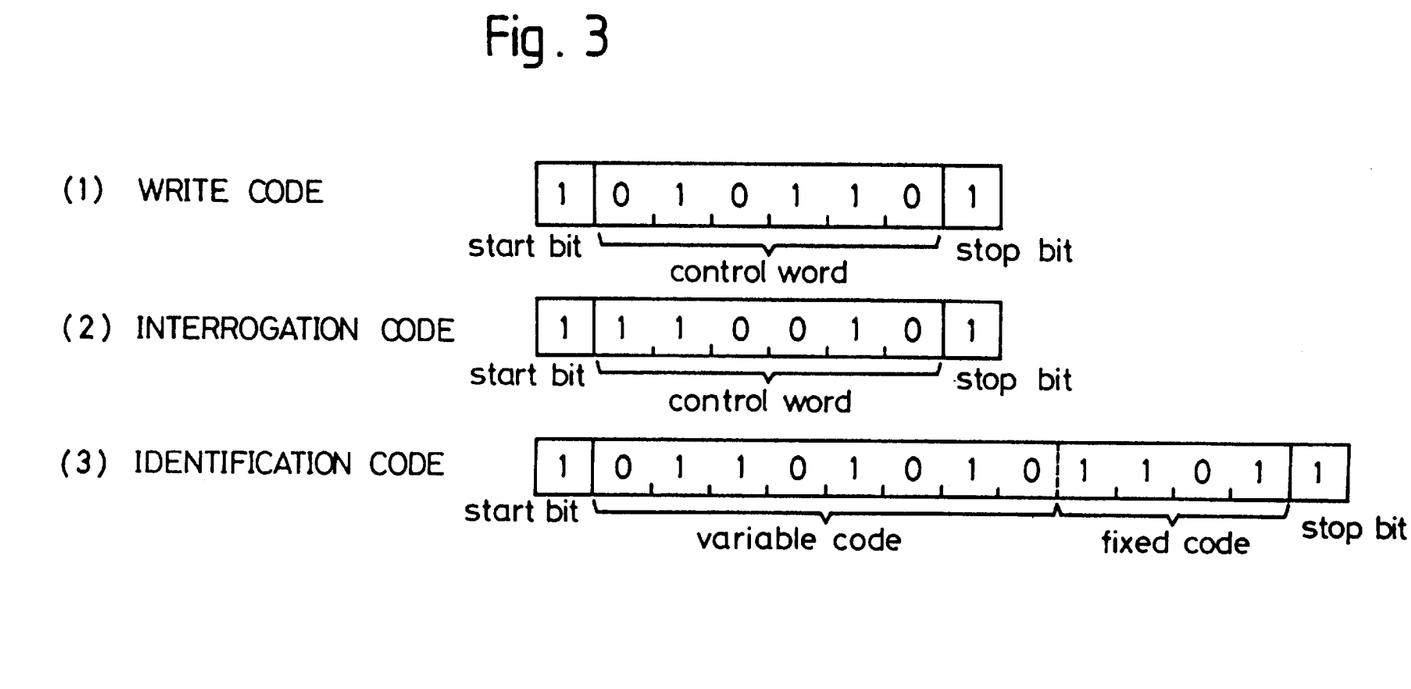
FIG. 3 is a schematic diagram representing the write code created by the transceiver of FIG. 1 and the identification code created by the transponder of FIG. 2.

Referring now to FIG. 1, a transceiver 1 can be seen which forms part of an objet identification system according to the present invention. The transceiver 1 comprises notably a central control unit 2, a write code generator 3, an interrogation code generator 4, a modulator 5, a power amplifier 6 and an antenna 7. When it receives a control signal form the central control unit 2, the write code generator 3 creates a write code constituted by bits able to have a high logical state or a low logical state. As can be seen in FIG. 3, the write code includes a start bit and a stop bit, separated by a series of bits forming a code being able to be recognised by transponders as a control word for a write operation.

Similarly, when it receives a control signal from the central control unit 2, the interrogation code generator 4 creates an interrogation code constituted by bits able to have a high logical state or a low logical state. FIG. 3 shows that the interrogation code includes a start bit and a stop bit separated by a series of bits forming a code being able to be recognised by transponders as a control word for the transmission of their identification code. This operation will be explained in detail further on.

The modulator 5 modulates either the write code or the interrogation code respectively from the write code generator 3 and the interrogation code generator 4 by amplitude modulation. The amplifier 6 amplifies these modulated codes and then supplies them to the antenna 7 for transmission. The amplitude of the write signal and the interrogation signal varies as a function of logical state of the bits of the code which these signals contain.

In another embodiment, the transceiver may also use an interrogation signal having a fixed frequency, thus creating a carrier signal to which the transponder automatically responds. For example, the transponder may modify either the amplitude or the frequency of the carrier signal as a function of the bits of the code which the transponder transmits.

The transceiver 1 further comprises a demodulation circuit 8, a detection and amplification circuit 9, memory devices 10 and 11, a comparator 12 and an output port 13. The demodulation circuit 8 extracts the modulation signal created by the transponder and eliminates the signal from the carrier. This complex signal is supplied to the demodulation circuit 8 by the antenna 7. The demodulation circuit 8 transmits a signal having a weak amplitude which is detected and amplified by the detection and amplification circuit 9. This latter supplies this signal, according to a control signal from the central control unit 2, either to the memory device 10 or to the comparator 12.

The memory devices 10 and 11 are preferably volatile memories, for example random access memories. These memories include sufficient registers to be able to store identification codes corresponding to all the competitors of the competition from which the object identification system is intended. Access to the registers, for the reading and writing of the access codes, is controlled by the central control unit 2.

The comparator 12 compares the demodulated signals, that is to say the identification codes of the transponders, with the codes stored in the memory device 10. When there is a coincidence between the identification codes received by the antenna 7 and one of the identification codes stored in the memory device 10, the comparator 12 supplies this code to the memory device 11. The central control unit 2 controls the register in the memory device 11 which can be accessed such that the identification codes received by the transceiver are stored in their arrival order. Access to the contents of the memory device 11 is made possible by the output port 13.

The transceiver 1 further comprises two control switches 14 and 15. These switches enable a user to select two modes of operation of the object identification system, that is an initialisation mode and a mode of regular operation. These operations modes will be explained in detail further on.

Figure 2:
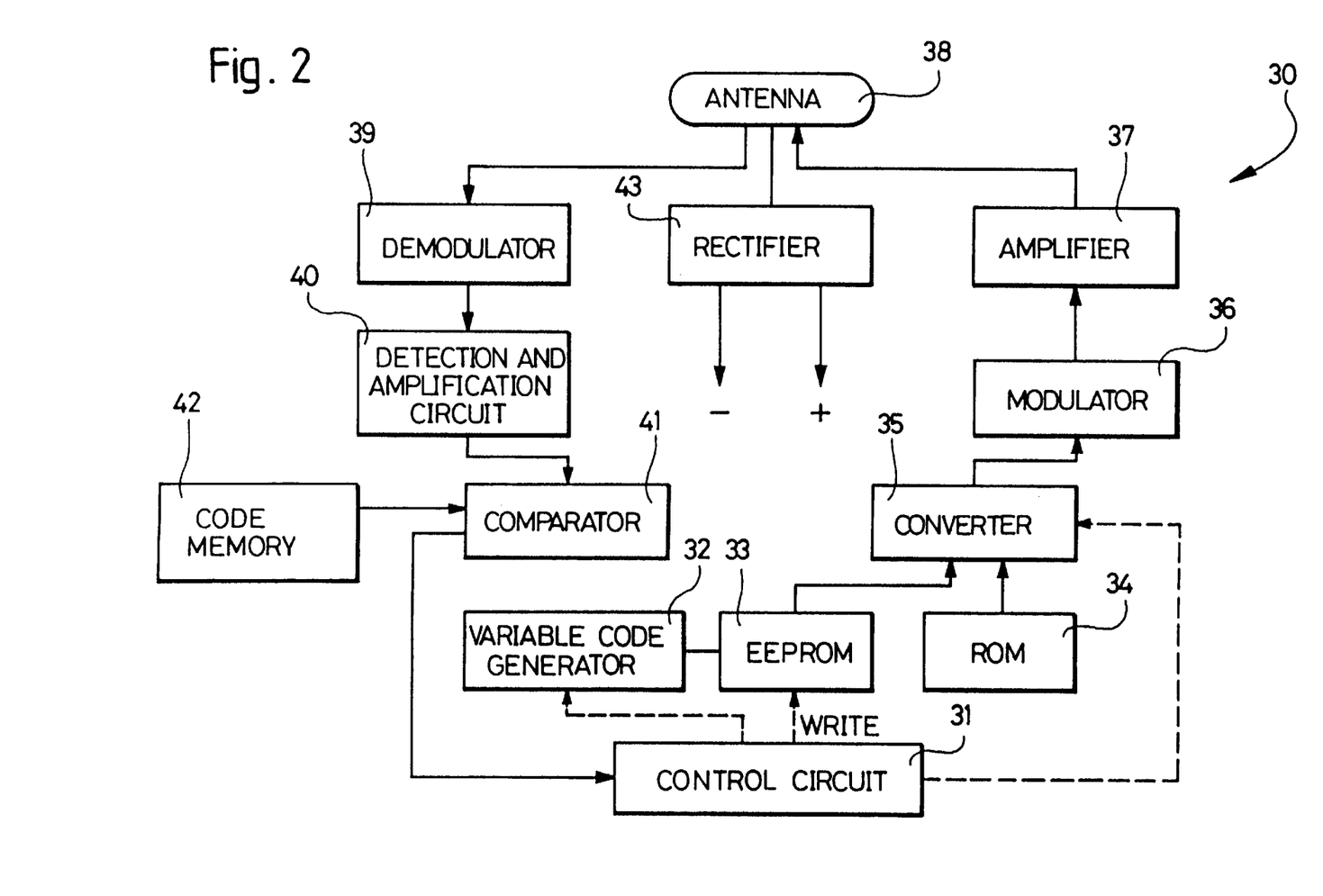
FIG. 2 is a schematic diagram of a transponder forming part of the object identification system of the present invention.

FIG. 2 shows a schematic block diagram of a transponder 30 intended to be used in conjunction with the transceiver of FIG. 1. The transponder 30 comprises notably a control circuit 31, a variable code generator 32, two memory devices 33 and 34, a code converter 35, a modulator 36, an amplifier 37, an antenna 38, a demodulator 39, a detection and amplification circuit 40, a comparator 41, a code memory 42 and a rectifier enabling to be supplied to the components of the transponder by electromagnetic coupling. The above-mentioned components of the transponder 30 are in general low cost components and have a signal detection sensitivity which is limited with respect to the transceiver 1.

The antenna 38 enables, firstly, the power supply of the transponder, due to the rectifier 43, and, secondly, the reception by the transponder 30 of the write and interrogation signals transmitted by the transceiver 1. These signals are then supplied to the demodulator 39. This latter extracts the modulation signal created by the transceiver and eliminates this signal from the carrier. The demodulator 39 transmits a signal having a weak amplitude which is detected and amplified by the detection and amplification circuit 40.

The code memory 42 stores the write and interrogation codes to which the transponder reacts. The comparator 41 compares the code at the output of the detection and amplification circuit 40 at the output of the detection and amplification circuit 40 to the codes stored in the code memory 42. The case being, the comparator 41 sends at its output a coincidence signal to the control circuit 31, this signal indicating either that a write code or an interrogation code as just been received by the transponder 30.

In another embodiment, the transceiver may use an interrogation signal having a fixed constant frequency, thus creating a carrier signal to which the transponder automatically responds. A skilled person will be able to envisage other means which cause the writing of the identification code in the transponder.

The variable code generator 32 creates a variable code at its output in response to a control signal from the control circuit 31. Preferably, the variable code created by the generator 32 is a random or pseudo-random code. Preferably, the variable code generator 32 is constituted by a circuit which is simple to realise, such as a counter whose contents increase or decrease asynchronously with respect to the transmission of the right signal by the transceiver 1. Furthermore, the counter may be adapted such that its contents are not set to zero during the start up of the electronic part of the transponder 30.

The memory device 33 is intended to store the variable code generated by the variable code generator 32. Preferable constituted by a non-volatile memory, such as an electrically effacable programmable read only memory, the random code is stored in the memory device 33 in response to a control signal from the control circuit 31.

On the other hand, the memory device 34 is intended to store a fixed code which is known in advance of the start of the competition in question. The memory device 34 may be constituted, for example, by a read only memory. In another embodiment, the memory device 34 may even be incorporated as part of the memory device 33.

The converter 35 converts the variable code and the fixed code stored respectively in the memory devices 33 and 34 into an identification code, such as represented in FIG. 3. The identification code is constituted, for example, by a start bit, followed by the random code of the memory device 33, the fixed code of the memory device 34 and finally by a stop bit. The variable and the fixed codes form together a series of bits being able to be recognised by the transceiver 1 as a word enabling the identification of the transponder 30. The identification code supplied by the converter 35 is then modulated by the modulator 36. The result of the identification signal is amplified by the amplifier 39 for transmission by the antenna 38. The amplitude of the amplification signal varies as a function of the logical states of the bits of the code which this signal contains.

The operation of the object identification system including the transceiver 1 and the transponder 30 will now be described in its two operating modes.

The first of its operating modes is the initialisation mode. The object identification system is placed in this mode before the start of the competition in question so as to generate an identification code in each transponder and to communicate this identification code to the transceiver of the system. When the control switch 14 of the transceiver 1 is activated, the central control unit activates the write code generator. The write code generated at the output of this latter is modulated and amplified respectively by the modulator 5 and the amplifier 6. The write signal thus created is then transmitted by the antenna 7.

Due to the limited signal detection sensitivity of the components which constitutes the transponder, the write code generator 3, the interrogation code generator 4, the modulator 5 and the amplifier 6 are adapted so as the amplitude of the interrogation signal during its transmission varies, as a function of the logical states of the bits which constitute the write and interrogation codes, by a substantial value. In object identification systems realised in the context of the present invention, it has been determined that an amplitude variation in excess of 15 volts represents a suitable value. Preferably, this amplitude variation of the interrogation signal during its transmission is superior 200 volts. Practical experiences have also shown that a maximum amplitude, during the transmission of the interrogation and write signals, which is in excess of 15 volts benefits the reception of these signals by the transponder 30.

The write signal is thus captured by the antenna 38 by the transponder 30 and, after its demodulation and its amplification respectively by the demodulator 39 and by the detection and the amplification circuit 40, the write code is extracted from this signal. The comparator 41 compares the detected code with the codes stored in the code memory 42 and, because there will be a coincidence between the write code stored in the memory 42 and the write code received by the antenna 38 in this case, a signal representative of this coincidence will be supplied to the control circuit 31.

Next, the control circuit 31 supplies a control signal to the counter 32 to stop the variation of its contents. A binary word corresponding to these contents is written into the electrically effacable programmable read only memory 33.

After this writing, the converter 35 converts the binary word stored in the memory devices 33 and 34 into an identification code, such as the identification code represented in FIG. 3. This identification code will be used, during the regular operation mode, by the transceiver 1 to enable the identification of the transponder 30. The identification code at the output of the converter 35 is then modulated by the modulator 36. The resulting identification signal is amplified by the amplifier 37 for transmission by the antenna 38.

Because the transceiver 1 has a greater signal detection sensitivity then that of the transponder 30, and in order to prevent the non-authorised detection of the identification signal transmitted by the transponder 30, the modulator 36 and the amplifier 37 are adapted such that the amplitude variation of the identification signal, during its transmission, is less than the amplitude variation of the interrogation signal during its transmission. In object identification system realised in the context of the present invention, it has been determined that an amplitude variation during the transmission of the identification signal which is less than 15 volts is suitable. Preferably, this amplitude variation is between 1 and 10 volts. Practical experiences have also shown that a maximum amplitude inferior to 15 volts, during the transmission of the identification signal, is preferable.

The transceiver 1 detects the identification signal transmitted by the transponder 30 due to its antenna 7. The demodulation circuit 8 extracts the identification code and then supplies it to the detection and amplification circuit 9. This latter amplifies it and then supplies it, according to a control signal from the central control unit 2, to the memory device 10 for storing. The address in the memory device 10 at which each identification code stored is determined by the central control unit 2.

The second operating mode is the regular operation mode. The object identification system is placed in this mode during the arrival of each competitor in order to interrogate its transponder and to cause the transmission of its identification code to the transceiver of the system. When the control switch 15 of the transceiver 1 is activated, the central control unit activates the interrogation code generator 4. The interrogator 4 created at the output of this latter is modulated and amplified respectively by the modulator 5 and the amplifier 6. The interrogation signal thus created is then transmitted by the antenna 7. In another embodiment, the interrogation signal may be composed solely by the presence of a carrier frequency of fixed amplitude.

This interrogation signal is captured by the antenna 38 of the transponder 30 and, after its demodulation and its amplification respectively by the demodulator 39 and by the detection and amplification circuit 40, the interrogation code is extracted from this signal. The comparator 41 compares the detected code with the code stored in the code memory 42 and, because there will be a coincidence between the interrogation code stored in the memory 42 and the interrogation code received by the antenna 38 in this case, a signal representative of this coincidence will then be supplied to the control circuit 31.

Next, the control circuit 31 supplies a control signal to the converter 25 so that this latter converts the binary words stored in the memory devices 33 and 34 into its identification code. The identification code at the output of the converter 35 is then modulated by the modulator 36. The resulting identification signal is amplified by the amplifier 37 for transmission by the antenna 38.

The transceiver 1 detects the identification signal transmitted by the transponder 30 by its antenna 7. The demodulation circuit 8 extracts the identification code and then supplies it to the detection of an amplification circuit 9. This latter supplies the amplified identification signal according to a control signal from the central control unit 2, to the comparator 12.

The comparator 12 compares the demodulated identification signal, that is to say the identification code transmitted by the transponder 30, with the codes stored in the memory device 10. Because there will be a coincidence between the identification code received by the antenna and one of the identification codes stored in the memory device 10, code which was stored in the memory 10 in the initialisation mode, the comparator 12 supplies this code to the memory device 11 for storing in its arrival order. In another embodiment, it may be suitable to store the time of day of arrival or other information corresponding to each transponder in the memory device 11.

Figure 4:
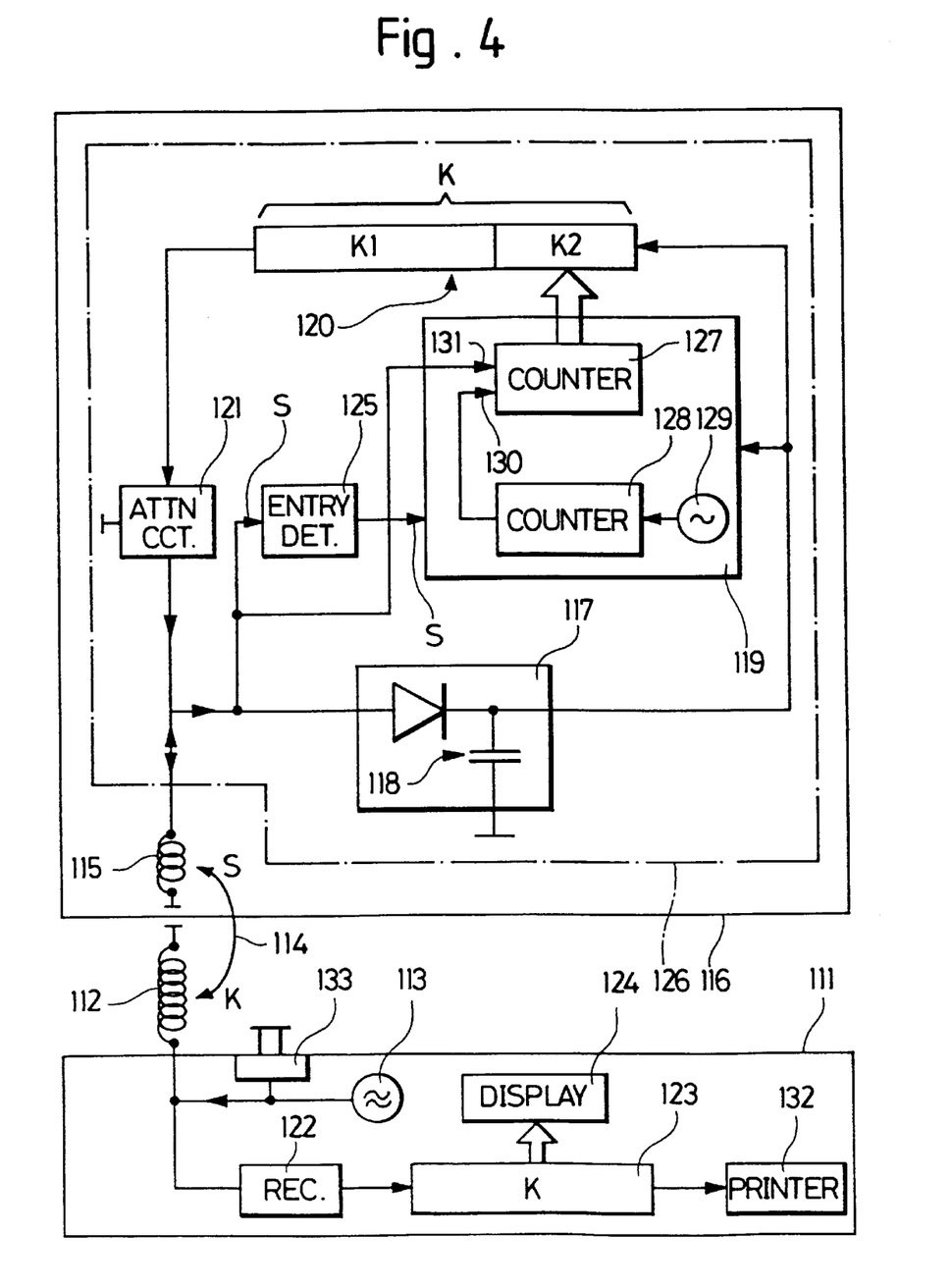
FIG. 4 is a schematic diagrams of another embodiment of a transceiver and a transponder forming part of the object identification system of the present invention.

FIG. 4 shows another embodiment of the object identification system of the present invention. In this figure, at least one inductive antenna 112 in the form of a flat (axially short) coil is connected to a transceiver 11, as described in more detail in EP-A-0 582 137. The antenna 112 is fed from a radio frequency generator 113 (typically with a frequency in the order of 100 KHz).

This radio frequency interrogation field 114 is intercepted by a ferrite antenna 115 of a transponder 116 which, moreover, has a responder 126 in its integrated circuit and is, for example, incorporated into the foot ring of a homing-pigeon participating in a race. In a supply circuit 117 of the responder 126, a memory (which preferably is a small physical memory in the from of a capacitor) is loaded by the RF energy of the field 114 received via the antenna 115 and thereafter rectified. Thereby, an operational voltage is provided for the variable code generator 119. A start instruction S, which may be manually released in the transceiver 111 by means of switch 113 during startup causes generator 119 to write a random information K2 into an identity memory which already holds fixed (invariable) identity information K1 for individualization of this code carrier and the individual, respectively, provided with it. In synchronism with the binary complete information K=K1+K2 serially readable from memory 120 and via an attenuation circuit 121 the antenna 115 and thus the RF field is attenuated which by means of a receiver 122 in the transceiver 111 beyond its antenna 112 is demodulatable as respective binary amplitude fluctuations and thus writable into a memory 123 as information K and e.g. printable or displayable therefrom.

A control instruction S from transceiver 111 via an entry detector 125 in transponder 116 causes the variable code generator 119 to produce a new (actual) random information K2 and to transfer it into memory 120 only when transceiver 111 with its antenna 112 is in the entry operation modus, i.e. takes the announcement of race participants. The registration of arrival of the race participant having this transponder 116 at the target site is different. Thereby it may be assured that for potential later control purposes the random information K2 assigned for the terminated race participation to the concrete code carrier is not overwritten at the end of this particular race by another random information but remains accessible in the responder 126 until the participant to whom this code carrier is permanently allocated will again start in a race whereupon he/she will be assigned a new random information K2.

To generate the random information K2 the generator 119 may be designed to have shift register feedbacks so as to operate as a pseudo random generator. In order to prevent recognition of its periodicity simply by trial and error, however, a comparably long polynomial would have to be provided. The random generator, however, may as well be a limiter-amplifier fed from a noise source having limited DC in the noise so that successive scans of the amplifier output signal result in a random bit sequence and thus again in the random information K2.

It is, however, particularly suitable to realize the random generator based on a counter. For this purpose, an output counter 127 of limited counting capacity (say, of 8 bits length i.e. 256 counts) is several times cyclically incremented through and then randomly stopped by supply of a signal 130 in order to transfer the reached count into identify memory 120 as the random information K2. The clock pulses 131 are suitably retrieved from operation of the transceiver 111, say, in the form of the generator frequency for interrogation field 114. Stop of the output counter takes place when a control counter 128 has reached a predetermined count for which purpose control counter 128 is clocked, without synchronization with output counter 127, from an internal free-running RC oscillator 129. Since the frequency thereof is not stabilized but depends for example upon the operating voltage and the ambient temperature a statistic fluctuation of the operation period of output counter 127 is assured in spite of the predetermined stop-count. And if this count is sufficiently high for many passages of output counter 127 a sufficiently homogeneous distribution of the respective end count will result, too, over the counting capacity. The end count will be transferred to identity memory 120 as the random information K2 when with the use of this transponder 116 for a near new race the fixed identity information K1 is to be associated with a new random information K2.

Additionally, it may be provided to switch the oscillator 129 in the transponder 116 on/off from the transceiver 111 which further improves the random distribution and allows for the possibility to avoid potential disturbances upon reading the identity memory 120 by switching off oscillator 129.

Further, it may be provided to replace the function of the control counter 128 with its local oscillator 129 with a stop signal 130 which upon entry of a race participant is transmitted by transceiver 111 at a randomly choosen instant via field 114.

During entry, each existing identity information K1 is associated a new random information K2 actually generated by the transponder 116 itself upon release of entry start instruction S by actuation of switch 33, and the total information K so combined is written into a participants' list via field 114, list which is taken under lock by an entry commission once the entry is terminated. Upon result processing, the target arrival times only of those participants are considered whose identity information K1, associated with the arrival time, is in turn associated with a random information K2 corresponding to that identity information K1 in the actually applicable participants' list. Since the transponder 116 receives its random information only with the participants' entry and is no more accessible after that instant (for example in the ring of a homing-pigeon locked for being transported to the start site), and thus the code carrier 16 only after return of the participant to the target site is available again, there is no opportunity prior to termination of the race to read the random information K2 actually allocated to the identity information K1 and to simulate a target arrival before the real return of the participant.

Finally, it should be noted that several modifications and/or improvements may be incorporated in the object identification system according to the invention without departing from the ambit thereof.

In that regard, it is clear that the object identification system of the present invention applies not only to human competitors in a competition, but may also be used in applications in many other domains. For example, the object identification system may be used to identify animal competitors participating in a competition.

The invention may also be used in a context of a security system, for example, to control the access to a certain security zone. Each of the persons authorised to access this zone may be supplied with a transponder. The transceiver may be mounted near an entrance door which is unlocked only when the identification code of an authorised transponder is detected.

A man skilled in the art will have no difficulty in envisaging other such embodiments and applications of the invention of this nature.

Whilst the embodiment described above uses amplitude modulation modulation of the signals transmitted by the transceiver and the transponder, it is also possible to effectuate a frequency modulation or either type of modulation of these signals.

What is claimed is:

1. An object identification system comprising:
    a transceiver having a first signal detection sensitivity and including means for transmitting a write signal; and
    a transponder having a second signal detection sensitivity less than said first sensitivity, the transponder including
        means for receiving and detecting said write signal,
        a memory device for storing an identification code of said transponder, said identification code including bits able to have a plurality of logical states,
        means for creating an identification signal representative of said identification code such that said identification signal is modulated by the logical state of said bits;
    said transceiver further comprising means for receiving and interpreting said identification signal,
    said transponder further comprising
        a variable code generator, and
        means for writing in said memory device, in response to the detection of said write signal, a variable code from said variable code generator such that said variable code constitutes at least a part of said identification code.

2. An object identification system according to claim 1, wherein said variable code generator comprises a random or pseudo-random code generator.

3. An object identification system according to claim 1, wherein said means for creating an identification signal are adapted such that said identification signal is amplitude modulated by the logical state of the bits which constitutes said identification code.

4. An object identification system comprising:
    a transceiver having a first signal detection sensitivity and including means for transmitting a write signal; and
    a transponder having a second signal detection sensitivity less than said first sensitivity, the transponder including
        means for receiving and detecting said write signal,
        memory device for storing an identification code of said transponder, said identification code including bits able to have a plurality of logical states, and
        means for creating an identification signal representative of said identification code such that said identification signal is modulated by the logical state of said bits;
    said transceiver further comprising means for receiving and interpreting said identification signal;
    said transponder further comprising
        a variable code generator,
        means for writing in said memory device, in response to the detection of said write signal, a variable code from said variable code generator such that said variable code constitutes at least part of said identification code, and
        modulation and amplification means for modulating a carrier with said identification code in order to create said identification signal.

5. An object identification system according to claim 4, wherein said modulation and amplification means are adapted such that amplitude variations during the transmission of said identification signal is less than 15 volts.

6. An object identification system according to claim 5, wherein the amplitude variation is between 1 and 10 volts.

7. An object identification system according to claim 5, wherein the maximum amplitude during the transmission of said identification signal is less than 15 volts.

8. An object identification system according to claim 1, wherein said means for transmitting a write signal are adapted such that said amplitude variation of the write signal during its transmission is greater than 15 volts.

9. An object identification system according to claim 8, wherein said amplitude variation of the write signal during its transmission is greater than 200 volts.

10. An object identification system according to claim 8, wherein the maximum amplitude during the transmission of said write signal is greater than 15 volts.

11. An object identification system according to claim 1, wherein said variable code generator comprises a counter whose contents vary asynchronously with the transmission of said write signal.

12. An object identification system according to claim 11, wherein the counter is not reset to zero during its initialization.

13. An object identification system according to claim 1, wherein said memory device is at least partially constituted by a non-volatile memory for storing said variable code.

14. An object identification system according to claim 1, wherein said identification code stored in said memory device includes, as well as said variable code, a code which may be determined in advance of the reception of said write signal by said transponder.

15. An object identification system according to claim 14 wherein said memory device is further constituted by a volatile memory for storing said code which may be determined in advance of the reception of said write signal.

16. An object identification system according to claim 1, wherein the variable code generator is provided with a feedback shift register for generating a pseudo random number sequence.

17. An object identification system according to claim 1, wherein the variable code generator is provided with a noise source followed by a limiter-amplifier for outputting a random bit sequence.

18. An object identification system comprising:
- a transceiver having a first signal detection sensitivity and including means for transmitting a write signal; and
- a transponder having a second signal detection sensitivity less than said first sensitivity, the transponder including means for receiving and detecting said write signal,
  - a memory device for storing an identification code of said transponder, said identification code including bits able to have a plurality of logical states, and
  - means for creating an identification signal representative of said identification code such that said identification signal is modulated by the logical state of said bits;
- said transceiver further comprising means for receiving and interpreting said identification signal;
- said transponder further comprising
  - a variable code generator, and
  - means for writing in said memory device, in response to the detection of said write signal, a variable code from said variable code generator such that said variable code constitutes at least part of said identification code; and
  - wherein said variable code generator includes a cyclically incremented and non-determinatedly stopping output counter.

19. An object identification system according to claim 18, wherein the output counter is clocked with pulses derived from an interrogation field.

20. An object identification system according to claim 19, wherein the output counter receives a stop pulse via the interrogation field.

21. An object identification system according to claim 18, wherein the output counter is stopped by a control counter upon reaching a predetermined control counter count, the latter in turn receiving its incrementing pulses from a free running oscillator within the transponder.

22. An object identification system according to claim 21, wherein the oscillator is adapted to be switched on and off via the interrogation field.

* * * * *